Nov. 18, 1924.

J. VAN DE PUTTE

TRICYCLE

Filed Oct. 17, 1922

Inventor
J. Van de Putte

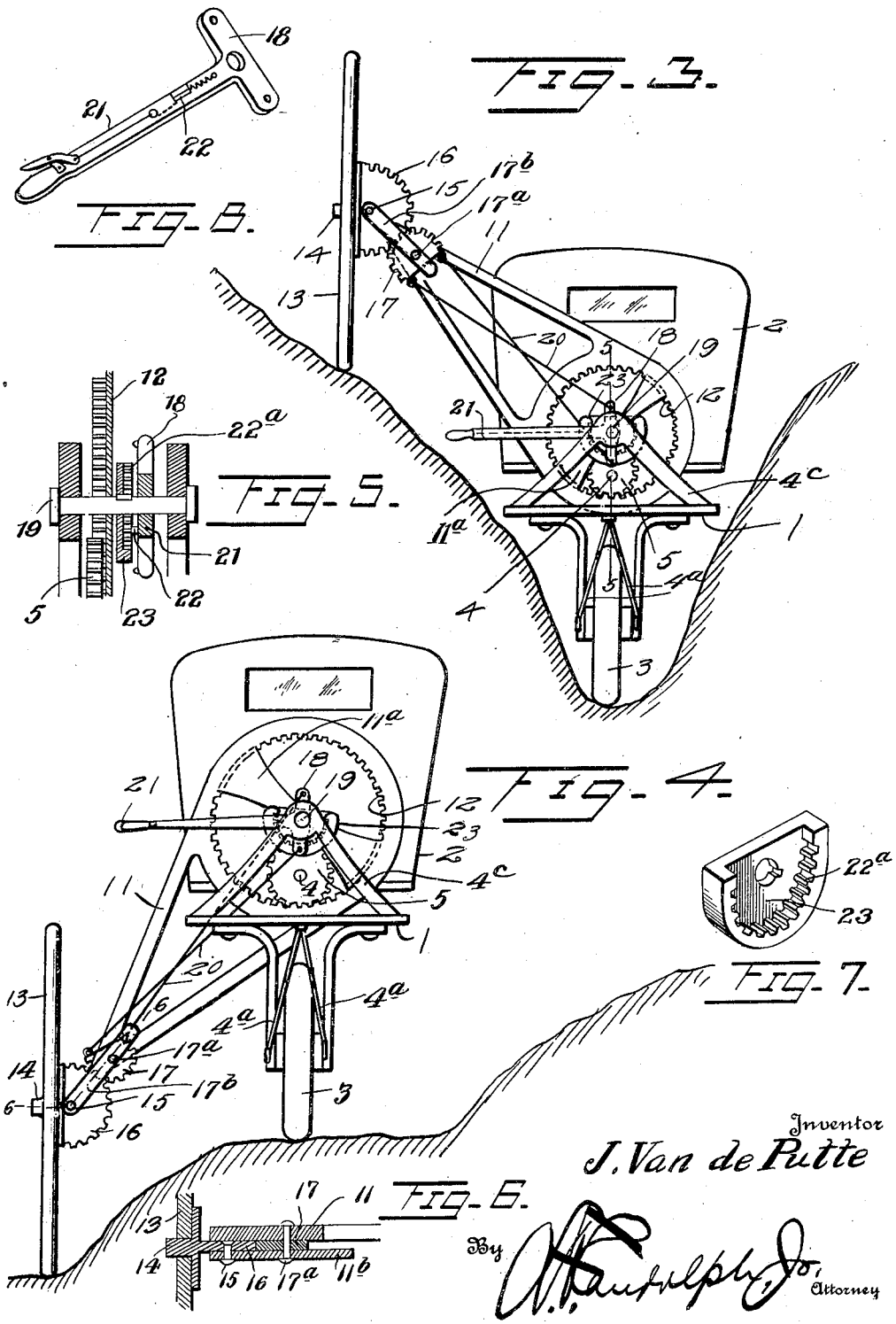

Patented Nov. 18, 1924.

1,516,360

UNITED STATES PATENT OFFICE.

JOHN VAN DE PUTTE, OF SAN ANTONIO, TEXAS.

TRICYCLE.

Application filed October 17, 1922. Serial No. 595,074.

*To all whom it may concern:*

Be it known that I, JOHN VAN DE PUTTE, a citizen of the United States, residing at San Antonio, in the county of Bexar and State of Texas, have invented certain new and useful Improvements in Tricycles; and I do hereby declare the following to be a full, clear, and exact description of the invention, such as will enable others skilled in the art to which it appertains to make and use the same.

This invention relates to a vehicle of the tricycle type in which two wheels have a tandem arrangement and the third wheel being arranged normally at one side to give stability and support the vehicle in upright position.

In accordance with the present invention, the third wheel is adjustable so as to be moved up or down or from one side to the other as required, depending upon the nature of the trail, in order to properly support the vehicle in upright position.

The vehicle is primarily designed for traversing trails extending through undeveloped country and which trails extend between rocks and along ledges, and which usually are traversed on horseback, thereby consuming valuable time.

The present invention provides a vehicle adapted for travel over trails through wild and undeveloped country, the third wheel being adjustable so as to support the vehicle in upright position.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application,

Figure 1 is a top plan view of the vehicle embodying the invention,

Figure 2 is a side view thereof,

Figure 3 is a rear view, the third or side wheel being in elevated position,

Figure 4 is a view similar to Figure 3, the third wheel being in lowered position, Figure 5 is a detail section taken on the line 5—5 of Figure 3, Figure 6 is a detail section taken on the line 6—6 of Figure 4, Figure 7 is a detail perspective view of the latch plate, and Figure 8 is a detail perspective view of the anchor means.

Corresponding and like parts are referred to in the following description and designated in the several views of the drawings by like reference characters.

The vehicle embodies a suitable frame 1 and body 2, and is mounted upon wheels 3 having a tandem arrangement so as to run in the center of the trail or path. The vehicle may be of any design or construction and propelled by any preferred power in substantially the same manner as a motorcycle, but inasmuch as the present invention does not relate to the propelling means but to the adjustable third or side wheel, no attempt is made to illustrate or describe the propelling mechanism.

A longitudinally disposed shaft 4 is journaled in bearings $4^a$ and $4^b$ mounted upon the frame 1 and is provided at its rear end with a gear wheel 5 and at its front end with a gear wheel 6. A hollow shaft 7 mounted upon the steering rod 8, is provided with a gear wheel 9 which is in mesh with the gear wheel 6 and is likewise provided with a hand wheel 10 whereby the shafts 7 and 4 may be turned when required. An arm 11 by means of a spoke or web $11^a$ is loosely mounted or journaled on a shaft 19 fixed to the bearing $4^b$ and to a bracket $4^c$ supported by rods $4^d$ from the frame 1. The arm 11 has an internally toothed gear wheel 12 rigid thereon adjacent its inner end. The teeth of the gear wheel 5 mesh with those of gear wheel 12 so that the angular position of the arm 11 may be changed or that arm may be swung from one side to the other side of the machine through operation of the hand wheel 10. In the latter instance the machine is suitably supported in an upstanding position. The third or side wheel 13 is located beyond the outer end of the arm 11 and is journaled on a stub axle 14. A segmental gear 16, forming part of and located at the inner end of the axle 14, is in mesh with a companion segmental gear wheel 17 rotatably mounted on a horizontal pin or rod 17ª fixed to the outer end of the arm 11. A link or lever 17ᵇ is fulcrumed on pin 17ª and to its other end is pivoted the segmental gear 16 by means of a pin 15. An anchor member 18 journaled on rod or shaft 19 is connected by crossed draw elements 20 with the segmental gear 17 so as to automatically maintain the side or third wheel 13, irrespective of the angle of arm 11, in vertical or perpendicular position. A lever 21 is integral with the anchor member 18 and provides convenient means for reversing or adjusting the same according to the relative position of the third or side wheel 13. The lever 21 is held in the required adjusted position by means of a hand latch 22 and the teeth 22ª of a securing plate 23 fixed on rod 19.

When the arm 11 is swung from one side to the other of the vehicle through operation of the wheel 10, the lever 21, having previously been unlatched, is simultaneously operated in the same direction so as to reverse the position of the anchor member 18. Anchor member 18 constitutes in effect a head at the inner or fulcrum end of the lever.

The body of the vehicle is mounted upon the two wheels 3, the forward one of which is pivotally mounted to admit of steering by means of the shaft 8 in a manner well understood in the construction of motorcycles, the steering shaft 8 being provided with the usual steering wheel 24. The third or side wheel 13 is provided simply to maintain the vehicle in upright position and the same is adjustable to engage a portion of the trail at one side thereof to perform the function intended.

In operation, say the vehicle is traveling as in Figure 4, should it be desired to raise the wheel 13 according to road conditions, or to lower it from the position in Figure 3 to that of Figure 4, or an intermediate position, the wheel 10 is turned which through the medium of the gear wheels 9 and 6 rotate shaft 4, gear wheel 5, gear wheel 12, and accordingly swinging the arm 11 of which it forms part and due to the provision of the draw elements 20 and their association with the element 18, gear wheel 17, gear wheel 16 and the lever 17ᵇ causing the wheel 13 to always remain in and seek a vertical position. Should road conditions be such as to render it advisable to shift the wheel 13 to the opposite side of the machine to that shown in Figures 3 and 4, the machine is in any suitable manner supported to remain in a vertical position to which end, if desired, it may be equipped with supporting means such as a motorcycle usually has. The wheel 10 and lever 21 are then simultaneously turned so as to swing the wheel 13 over the top of the machine and to the right hand side thereof, and reverse the position of the connections of draw elements 20 with respect to the element 18, thus placing them in proper equalizing relation to the wheel in its new position. Prior to the swinging of said wheel 13, the lever 21 is unlatched. After swinging of the wheel 13, lever 21 is locked by the engagement of latch 22 with the appropriate teeth 22ª.

What is claimed is:

1. A vehicle of the character specified provided with a side supporting wheel which is vertically adjustable to various heights, and means to secure the supporting wheel at the different heights.

2. A vehicle of the character specified provided with a side supporting wheel adapted to be shifted from one side to the other.

3. A vehicle of the character specified provided with a side supporting wheel adapted to be reversed from one side to the other and adjustable vertically to various heights in either side position and means to secure the supporting wheel at the different heights.

4. A vehicle of the character specified provided with a side supporting wheel, laterally disposed and vertically movable means carrying the side wheel, and means for automatically maintaining the side wheel in perpendicular position in any vertical adjustment.

5. In a vehicle of the character specified, an arm movable from an axis longitudinally of the vehicle, a wheel at the outer end of the arm, and means for changing the angular position of the arm to effect vertical adjustment of the wheel carried thereby.

6. In a vehicle of the character specified, an arm movable from an axis disposed longitudinally of the vehicle, a wheel at the outer end of the pivoted arm, means for changing the angular position of the arm to effect vertical adjustment of the wheel carried thereby, and means for maintaining said wheel in perpendicular position at any vertical adjustment.

7. In a vehicle of the character specified, an arm movable from an axis disposed longitudinally of the vehicle, an axle pivoted to the outer end of said arm, a wheel mounted upon said axle, and means for automatically adjusting the axle when pivotally adjusting the arm whereby to maintain the wheel in perpendicular position.

8. In a vehicle of the character specified, a side supporting wheel, a laterally disposed arm carrying said wheel, and means to operate said arm through the power of the vehicle.

9. A vehicle of the character specified provided with a side supporting wheel, an arm carrying said wheel and disposed laterally of the vehicle, said arm being movable from an axis disposed longitudinally of the vehicle, said arm having an annular rack, and driving gear means in mesh with said rack.

10. A vehicle of the character specified provided with a side supporting wheel, an arm movable on an axis extending longitudinally of the vehicle and from one side of the vehicle to the other, a connection between said arm and wheel to maintain the latter vertical irrespective of the height of the wheel at either side of the machine, crossed elements extending from said connection, means to which said elements are fastened adjacent the axis of the arm, and said latter means being reversible according to the side of the machine on which the wheel is disposed.

In testimony whereof I affix my signature in presence of two witnesses.

JOHN VAN DE PUTTE.

Witnesses:
R. N. BURK,
EFFIE SNIDER.